US010003908B2

(12) United States Patent
Choi et al.

(10) Patent No.: US 10,003,908 B2
(45) Date of Patent: Jun. 19, 2018

(54) METHOD AND SYSTEM FOR ALLOCATING DEVICE OBJECT IDENTIFIER (OID) IN OPEN MACHINE-TO-MACHINE (M2M) SYSTEM AND APPLICATION SYSTEM APPLYING THE SAME

(71) Applicant: Korea Electronics Technology Institute, Seongnam-si, Gyeonggi-do (KR)

(72) Inventors: Sung Chan Choi, Seoul (KR); Jae Ho Kim, Yongin-si (KR); Jae Seok Yun, Yongin-si (KR); Kwang Ho Won, Yongin-si (KR); Sang Shin Lee, Yongin-si (KR); Il Yeup Ahn, Yongin-si (KR); Min Hwan Song, Seoul (KR); Jeong Wook Seo, Seongnam-si (KR)

(73) Assignee: Korea Electronics Technology Institute, Gyeonggi-Do (KR)

( * ) Notice: Subject to any disclaimer, the term of this patent is extended or adjusted under 35 U.S.C. 154(b) by 142 days.

(21) Appl. No.: 15/084,328

(22) Filed: Mar. 29, 2016

(65) Prior Publication Data

US 2016/0212571 A1    Jul. 21, 2016

Related U.S. Application Data

(63) Continuation of application No. PCT/KR2013/011216, filed on Dec. 5, 2013.

(30) Foreign Application Priority Data

Nov. 29, 2013    (KR) .......................... 10-2013-0147382

(51) Int. Cl.
    *H04W 4/00*    (2018.01)
    *H04L 29/12*   (2006.01)
    (Continued)

(52) U.S. Cl.
    CPC ............. *H04W 4/005* (2013.01); *H04L 61/20* (2013.01); *H04L 61/6004* (2013.01); *H04L 47/70* (2013.01); *H04L 67/12* (2013.01)

(58) Field of Classification Search
    CPC ..... H04W 12/06; H04W 12/08; H04W 4/008; H04W 4/005; G06F 21/44
    See application file for complete search history.

(56) References Cited

U.S. PATENT DOCUMENTS

2003/0167323 A1*    9/2003 Motoyama .......... G06F 11/0748
                                                          709/223
2006/0020414 A1    1/2006 Jiang
(Continued)

FOREIGN PATENT DOCUMENTS

WO    WO 2013-168911 A1    11/2013

OTHER PUBLICATIONS

International Search Report dated Aug. 27, 2014 in International Application No. PCT/KR2013/011216.
(Continued)

*Primary Examiner* — Jung Park
(74) *Attorney, Agent, or Firm* — Knobbe, Martens Olson & Bear, LLP (57) ABSTRACT

A method and system for allocating device object identifier (OID) in open machine-to-machine (m2m) system and application system applying the same are disclosed. In one aspect, the method includes generating, at a hardware server device, an OID of a first computing device, wherein the OID includes a first arc identifying a manufacturer of the first computing device, a second arc identifying a model number of the first computing device and a third arc identifying a serial number of the first computing device. The method also includes allocating, at the hardware server device, the generated OID to the first computing device.

19 Claims, 5 Drawing Sheets

(51) Int. Cl.
  *H04L 29/08* (2006.01)
  *H04L 12/911* (2013.01)

(56) References Cited

U.S. PATENT DOCUMENTS

| | | | | |
|---|---|---|---|---|
| 2012/0030327 A1* | 2/2012 | Conrad | ............... | H04L 41/0213 709/223 |
| 2014/0310384 A1* | 10/2014 | Choi | ....................... | H04L 67/12 709/218 |
| 2015/0019755 A1* | 1/2015 | Matsubara | .............. | H04L 67/18 709/242 |

OTHER PUBLICATIONS

OneM2M-TS-0001-V-2014-08, "oneM2M Functional Architecture Baseline Draft," Aug. 1, 2014.

TTAR-06.0259, "Allocation of Object Identifier {0 2 480 n}," Jun. 29, 2011 (http://www.tta.or.kr/data/ttas_view.jsp?rn=1&pk_num=TTAk.KO-06.0259).

TTAK.KO-06.0336-part1, "OID {1 2 410} Resolution System—Part 1: Requirements," Oct. 10, 2013 (http://www.tta.or.kr/data/ttas_view.jsp.rn=1&pk_num=TTAK.KO-06.0336-part1).

TTAK.KO-06.0336-part2, "OID {1 2 410} Resolution System—Part 2: Reference Model," Oct. 10, 2013 (http://www.tta.or.kr/data/ttas_view.jsp?rn=1 &pk_num=TTAK.KO-06.0336-part2).

\* cited by examiner

Example of Allocation of OID {0 2 480 0 1 x}

| Primary Integer value | Second Identifier | Description | Authority to Allocate Corresponding Arc |
|---|---|---|---|
| 100 | K-Electronics | K Electronics Company | Management Authority |

Example of Allocation of OID {0 2 480 0 1 100 y}

| Primary Integer value | Second Identifier | Description | Authority to Allocate Corresponding Arc |
|---|---|---|---|
| 10001 | ITHING-1S | ITHING-1S Model | Management Authority |

Example of Allocation of OID {0 2 480 0 1 100 10001 z}

| Primary Integer value | Second Identifier | Description | Authority to Allocate Corresponding Arc |
|---|---|---|---|
| 1284730 | S/N-1284730 | 1284730$^{th}$ Produced Device | Management Authority |

FIG. 4

Example of Allocation of OID {0 2 480 0 1 100 10001 1284730 a} for Gateway Subordinate Device having OID {0 2 480 0 1 100 10001 1284730}

| Primary Integer Value | Second Identifier | Description | Authority to Allocate Corresponding Arc |
|---|---|---|---|
| 5001 | EXT-5001 | Expanded ID 5001 | Gateway Device |

FIG. 5

METHOD AND SYSTEM FOR ALLOCATING DEVICE OBJECT IDENTIFIER (OID) IN OPEN MACHINE-TO-MACHINE (M2M) SYSTEM AND APPLICATION SYSTEM APPLYING THE SAME

CROSS-REFERENCE TO RELATED APPLICATIONS

This application is a continuation application, and claims the benefit under 35 U.S.C. §§ 120 and 365 of PCT Application No. PCT/KR2013/011216, filed on Dec. 5, 2013, which is hereby incorporated by reference. PCT/KR2013/011216 also claimed priority from Korean Patent Application No. 10-2013-0147382 filed on Nov. 29, 2013, which is hereby incorporated by reference.

BACKGROUND

Field

The described technology generally relates to a method and system for allocating a device object identifier (OID) in an open machine-to-machine (M2M) system and application system applying the same.

Description of the Related Technology

The "Internet of Things (IoT)" is defined as "a new information communication infrastructure that connects all kinds of things existing in the world through networks and enables persons and things to communicate with each other anytime and anywhere." That is, the IoT may be considered as an infrastructure for realizing a ubiquitous space in which things can be connected with one another anytime and anywhere.

In order to provide IoT/M2M services, all devices are required to be registered at a discovery service platform, found, and connected with one another. To achieve this, the devices need to be distinguished from one another by their respective IDs. In addition, the OIDs of the devices should ensure global uniqueness to allow the devices to be identified and found globally and uniquely. Accordingly, there is a need for a device OID system supporting this requirement.

The above information disclosed in this Background section is only to enhance the understanding of the background of the disclosure and therefore it may contain information that does not form the prior art that is already known in this country to a person of ordinary skill in the art.

SUMMARY OF CERTAIN INVENTIVE ASPECTS

One inventive aspect relates to a system and method for allocating a device OID, which ensure the global uniqueness of device identification in an open M2M system.

Another aspect is a device identification system which ensures global uniqueness in an IoT and open M2M system.

Another aspect is a method and a system for ensuring global uniqueness in registering and finding devices in an open M2M system based on the device identification system.

Another aspect is a method of allocating a device OID that includes: allocating an OID to a device; and registering the allocated OID, and the OID includes: a first arc indicating a manufacturer of the device; a second arc indicating a model of the device; and a third arc indicating a serial number of the device.

The second arc and the third arc may be determined by the manufacturer of the device.

The first arc may be determined by a management authority.

The method may further include allocating an OID to a subordinate device connected to the device, and the OID of the subordinate device may include the first arc, the second arc, the third arc, and a fourth arc which is allocated to the subordinate device.

The fourth arc may be allocated to the subordinate device by the device.

The OID may further include a higher arc which is in a higher position than the first arc.

Another aspect is a method of allocating an object identifier (OID) to a first computing device, the method comprising: generating, at a hardware server device, an OID of the first computing device, wherein the OID comprises a first arc identifying a manufacturer of the first computing device, a second arc identifying a model number of the first computing device and a third arc identifying a serial number of the first computing device; and allocating, at the hardware server device, the generated OID to the first computing device.

In the above method, the second arc and the third arc are managed by the manufacturer of the first computing device. In the above method, the first arc is managed by an OID management authority. The above method further comprises allocating an OID to a second computing device which operates under the first computing device, wherein the OID of the second computing device comprises the first arc, the second arc, the third arc, and a fourth arc. In the above method, the first computing device allocates the fourth arc to the second computing device.

In the above method, the OID further comprises a higher arc which is in a higher position than the first arc. In the above method, the hardware server device comprises an OID registration and resolution system. In the above method, the first computing device comprises an Intent of Things (IoT) device. The above method further comprises providing, at the hardware server device, an IoT service to the first computing device based on the OID.

Another aspect is a method of connecting to a computing device via a communication network, the method comprising: acquiring an object identifier (OID) of the computing device from a hardware server device, wherein the OID comprises a first arc identifying a manufacturer of the computing device, a second arc identifying a model number of the computing device and a third arc identifying a serial number of the computing device; and connecting, via the communication network, to the computing device based on the acquired OID.

In the above method, the OID further comprises a higher arc which is in a higher position than the first arc. In the above method, the hardware server device comprises an OID registration and resolution system. In the above method, the computing device comprises an Intent of Things (IoT) device.

Another aspect is a method of searching a computing device via a communication network, the method comprising: acquiring an object identifier (OID) of the computing device from a hardware server device, wherein the OID comprises a first arc identifying a manufacturer of the computing device, a second arc identifying a model number of the computing device and a third arc identifying a serial number of the computing device; and accessing the hardware server device to search the computing device based on the acquired OID.

In the above method, the hardware server device comprises an OID registration and resolution system. In the above method, the computing device comprises an Intent of Things (IoT) device.

Another aspect is a system for allocating an object identifier (OID) to a computing device, the system comprising: a memory device configured to store a plurality of device OIDs; and a hardware processor device being in data communication with the memory device and configured to generate an OID of the computing device, allocate the generated OID to the computing device and store the generated OID in the memory, wherein the OID comprises a first arc identifying a manufacturer of the computing device, a second arc identifying a model number of the computing device and a third arc identifying a serial number of the computing device.

In the above system, the computing device comprises an Intent of Things (IoT) device.

Another aspect is a computing device for obtaining an object identifier (OID) from a hardware server device, the device comprising: a hardware processor device configured to request and receive an OID from a hardware server device, wherein the OID comprises a first arc identifying a manufacturer of the computing device, a second arc identifying a model number of the computing device and a third arc identifying a serial number of the computing device; and a memory device being in data communication with the hardware processor device and configured to store the received OID.

In the above device, the OID further comprises a higher arc which is in a higher position than the first arc.

According to at least one of the disclosed embodiments, in registering and finding devices in an open M2M system based on a device identification system which ensures global uniqueness in an IoT and open M2M system, global uniqueness can be ensured.

Furthermore, a device OID system is allocated a sequence of arcs based on a manufacturer, a model, a serial number, and an expanded number, and, through this, device models using API can be identified and an expanded number can be allocated to a gateway subordinate device. Therefore, all devices can be identified by globally unique IDs.

DETAILED DESCRIPTION OF CERTAIN INVENTIVE EMBODIMENTS

Hereinafter, embodiments will be described in more detail with reference to the accompanying drawings.

Since an IoT system includes a plurality of IoT devices, the operating devices are desirable to be identified by globally unique IDs, so that a corresponding device can be found and accessed and thus various IoT services can be realized.

Hereinafter, an OID-based IoT device identification system for supporting discovery and identification of IoT devices and a procedure for allocating and managing thereof will be described.

Figure 1:
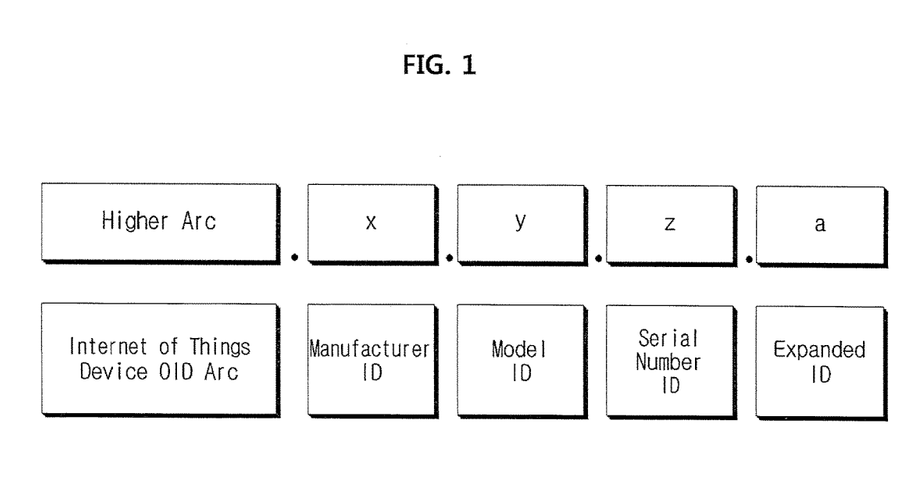
FIG. 1 is a view showing an OID system for identifying an IoT device according to some embodiments.

FIG. 1 is a view showing an OID system for identifying an IoT device. The IoT device may include, but is not limited to, a TV, a laptop, a tablet, a mobile phone, a smartphone, a personal digital assistant (PDA), a personal media player PMP), a game console, a digital camera, a computer peripheral device, a communication device (e.g., Bluetooth or Zigbee devices), a hearing aid, a wearable device, other consumer electronics or home appliance products, or any other computing device that can communicate with other IoT devices or computing devices via a wired or wireless communication network. As shown in FIG. 1, the OID system includes a higher arc and a sequence of four arcs. The four arcs respectively represent a manufacturer ID, a product model ID, a product serial number ID, and an expanded ID.

The "higher arc" may be issued and allocated for the purpose of an IoT device. This will be explained in detail below with reference to FIG. 2.

The expanded ID, which is an expanded arc (a), may be allocated only when necessary and thus the IoT device serves as an identifier. Since this ID is allocated only when necessary, the IoT device OID may take the form of {higher arc x y z} or {higher arc x y z a}.

Hereinafter, each of the arcs constituting the IoT device OID (detailed IDs) will be described in detail.

1) Manufacturer ID

The first arc x among the sequential 4 arcs recorded on the IoT device OID is used to identify the manufacturer which manufactures and produces the IoT device. The arc x for the "manufacturer ID" may be allocated and managed by an authority which manages the higher arc of the IoT device identification system.

2) Model OID

The second arc y among the sequential 4 arcs recorded on the IoT device OID is used to identify the product model number of the IoT device. The arc y for the model OID may be allocated and managed by the authority to which the higher arc (arc x) is allocated.

3) Serial Number OID

The third arc z among the sequential 4 arcs recorded on the IoT device OID is used to identify the product serial number of the IoT device. The arc z for the serial number OID may be allocated and managed by the authority.

4) Expanded ID

The fourth arc a among the sequential 4 arcs recorded on the IoT device OID is used to identify an IoT device (for example, a legacy device) to which an OID has not been allocated.

The IoT device in which an OID is not allocated may have a limited communication capability and thus may be connected to an IoT device which serves as a gateway to receive services.

Accordingly, the arc for the expanded ID may be allocated by the "IoT gateway device" connected to the IoT device (allocated no OID) by adding the fourth arc a to the OID allocated to the IoT gateway device, and the arc a may be managed by the authority.

5) Higher Arc

The OID is a mechanism for identifying all kinds of objects, concepts, and things. The OID may be represented as a sequence of integer values according to an OID tree-based hierarchical name structure in order to identify objects.

Figure 2:
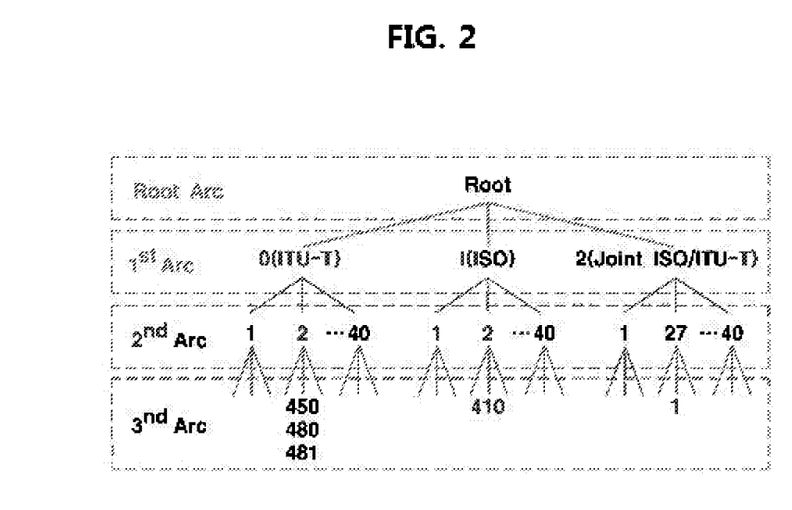
FIG. 2 is a view showing a global OID tree according to some embodiments.

FIG. 2 is a view showing a global OID tree. The OID system formed by the tree shown in FIG. 2 corresponds to the higher arc of FIG. 1. In FIG. 2, ISO represents international organization for standardization. ITU represents international telecommunications union. ITU-T represents the telecommunication standardization sector of the ITU.

The OID system uses three uppermost areas 0 (ITU-T management), 1 (ISO management), and 2 (ISO/ITU-T common management) in total, and each of the areas is individually or commonly managed by ISO. In addition, the OID may be hierarchically allocated and the organization or the nation to which a certain arc is allocated may have the authority to allocate its lower arcs. The general procedure for allocating the lower arcs may follow the procedures for the operation of OID registration authorities such as ITU-T X. 660 1 ISO/IEC 9834-1.

Hereinafter, examples of allocating an OID according to the IoT device OID system shown in FIG. 1 will be described. Herein, it is assumed that the higher arc of the IoT device OID is {0 2 480 0 1}.

Figure 3:
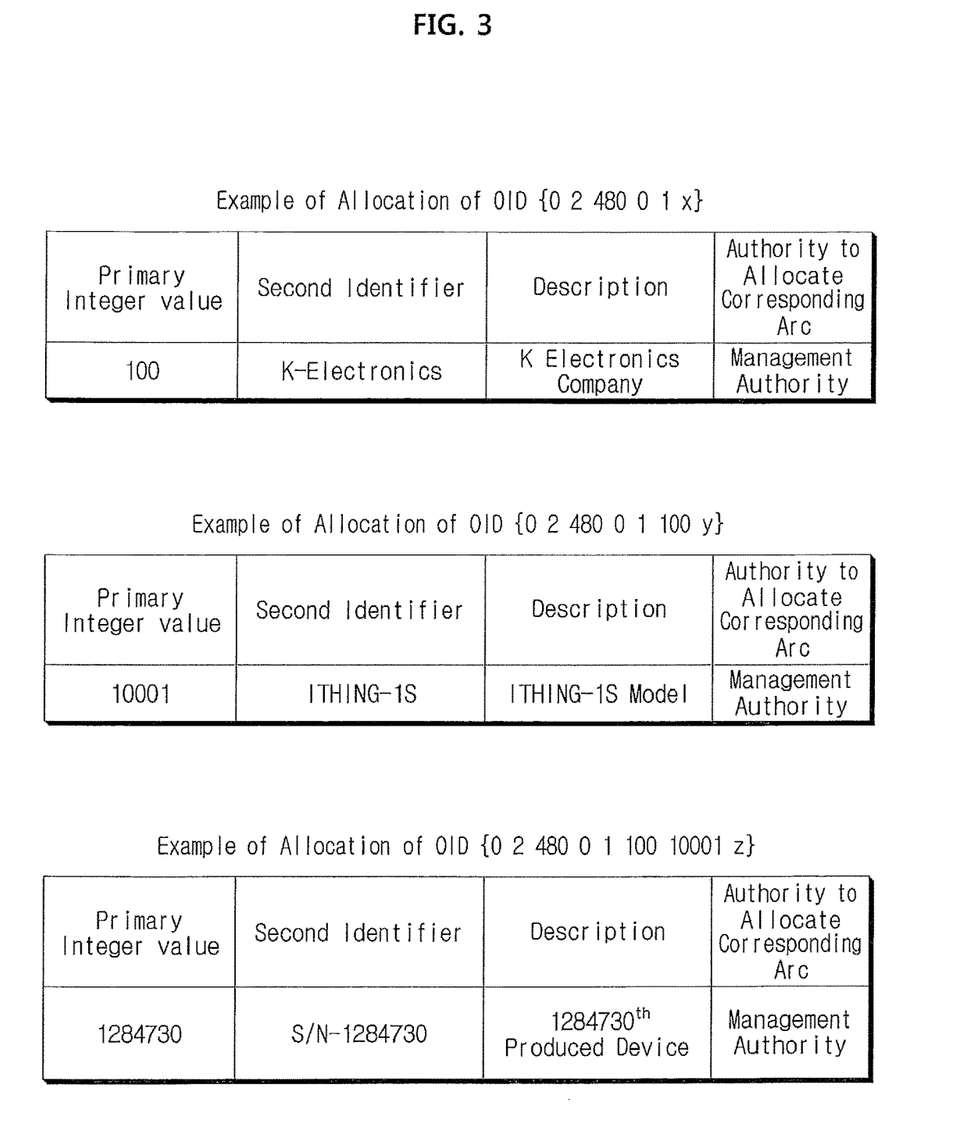
FIGS. 3 and 4 are views showing examples of a method for allocating an IoT device OID according to some embodiments.

In FIG. 3, an IoT device OID is allocated by recording ID "100" of a manufacture "K electronics company" on the first arc (x), recording ID "10001" of a model name "ITHING-1S" on the second arc (y), and recording ID "1284730" of serial number "1284730" on the third arc (z). The OID can be generated and allocated by a registration/resolution system 200 (see FIG. 5) or other hardware server device. The registration/resolution system 200 may include or be a component of a processing system implemented with one or more processors. The one or more processors may be implemented with any combination of general-purpose microprocessors, microcontrollers or digital signal processors (DSPs). The processing system may also include physical machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

Some IoT devices may not be allocated an IoT device OID by the manufacturer when being produced. These IoT devices may be connected to a gateway due to their limited communication capability and provide a service. The gateway may allocate OIDs to the IoT devices.

Figure 4:
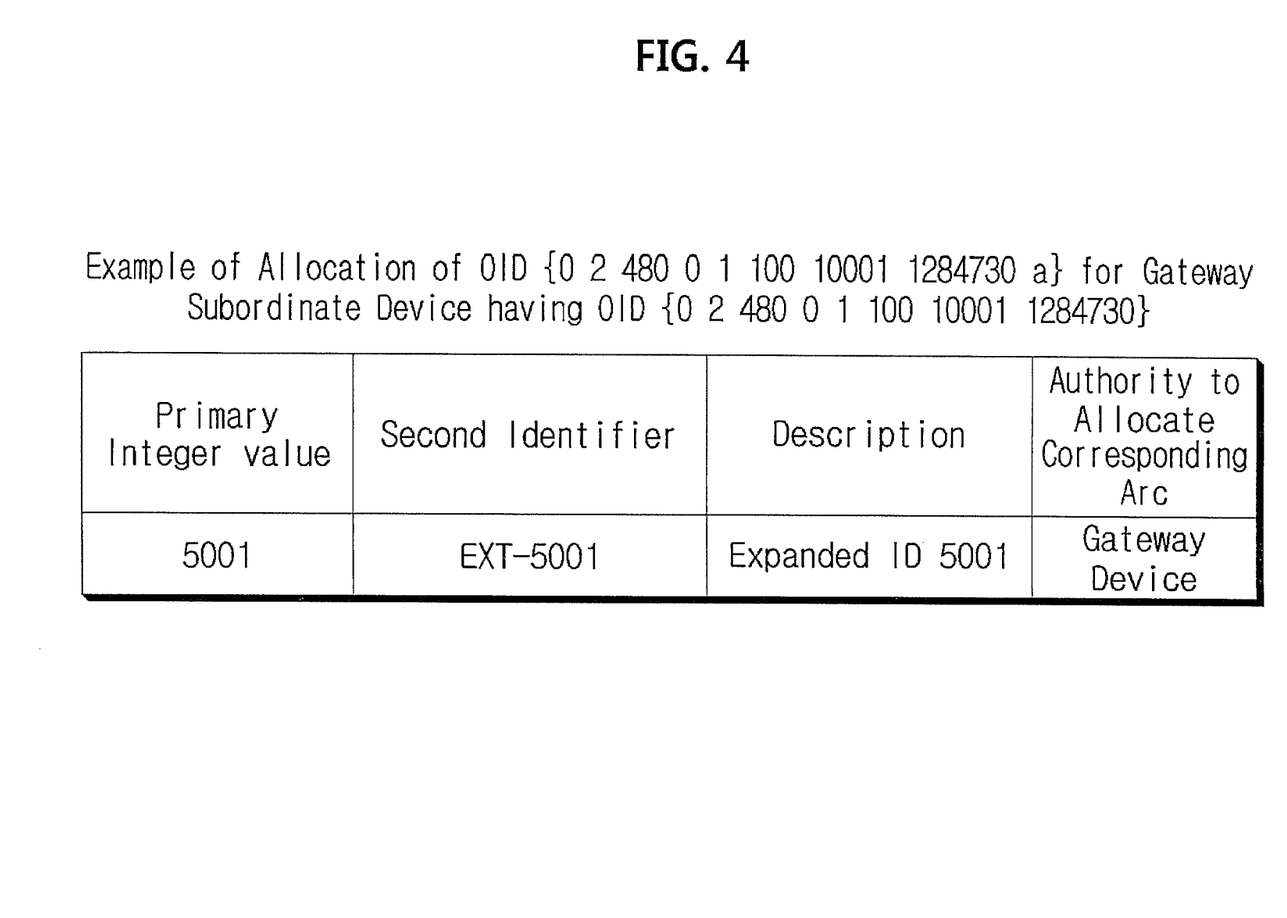

When the IoT device receiving the OID as shown in FIG. 3 is a gateway, a method of allocating an OID through the gateway is illustrated in FIG. 4.

Referring to FIG. 4, the gateway has an OID of {0 2 480 0 1 100 10001 1284730} (see FIG. 3). The gateway may allocate an OID to its subordinate IoT device, which does not have an OID, by adding an expanded ID "5001" to the OID of the gateway. Here, the expanded ID "5001" is a lower arc (z).

Hereinafter, an application system using an IoT device OID will be explained in detail with reference to FIG. 5.

OIDs may be allocated to IoT devices 400 in the above-described method and may be registered at the registration/resolution system 200. An IoT service provider may purchase the IoT devices 400 from manufacturers and provide IoT services by connecting the IoT devices 400 to a service provider server 300.

A user may receive the IoT service through a user's terminal 100. The IoT service may be provided on the premise that the user finds the IoT devices 400 to acquire data or control operations, and acquires the OIDs in the registration/resolution system 200 using the terminal 100.

Thereafter, the user may access the service provider server 300 through the terminal 100, and acquire data or controls operations regarding the IoT devices 400 based on the OIDs.

Figure 5:
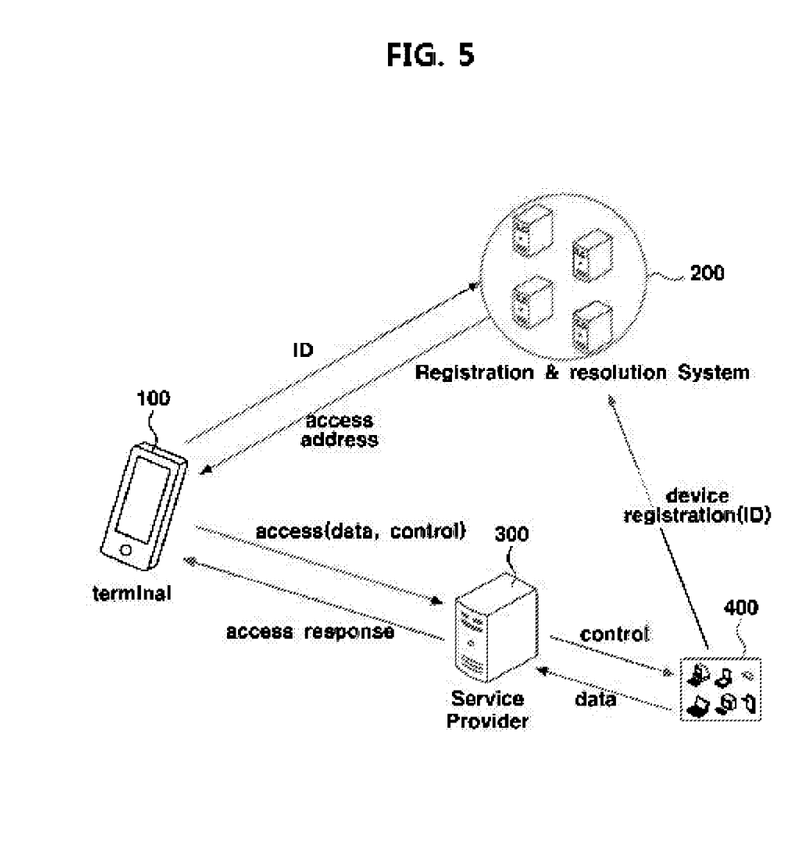
FIG. 5 is a view showing an application system using an IoT device OID according to some embodiments.

In addition, although not shown in FIG. 5, the user may acquire data or control operations by connecting to the IoT devices 400 via a peer-to-peer (P2P) communication protocol based on the OIDs through the terminal 100.

The application system shown in FIG. 5 is merely an example, and the described technology can be applied to all application services using IoT devices.

Other operations and/or features relating to an OID are described in ONEM2M Technical Specification published by oneM2M Partners Type 1 on Aug. 1, 2014 as Document Number "oneM2M-TS-0001-V-2014-08" and Document Name "oneM2M Functional Architecture Baseline Draft," which is hereby incorporated by reference. See, for example, Section 7.1.5 "M2M Node Identifier (M2M-Node-ID)" and Annex H (informative) "Object Identifier Based M2M Device Identifier."

While the inventive technology has been described with respect to the accompanying drawings, it will be understood by those of ordinary skill in the art that the present invention is not limited to the above-described exemplary embodiments, and various changes in form and details may be made therein without departing from the spirit and scope of the present invention as defined by the following claims. In addition, various changes should not be interpreted as being separated from the technical idea or scope of the present invention.

What is claimed is:

1. A method of allocating an object identifier (OID) to a device, the method comprising:
    allocating, at a hardware device, an OID to a first device, wherein the OID of the first device comprises a first arc identifying a manufacturer of the first device, a second arc identifying a product model of the first device and a third arc identifying a serial number of the first device; and
    allocating an OID to a second device which operates under the first device, wherein the OID of the second device comprises the first arc, the second arc, the third arc, and fourth arc.

2. The method of claim 1, wherein the second arc and the third arc are managed by the manufacturer of the first device.

3. The method of claim 2, wherein the first arc is managed by an OID management authority.

4. The method of claim 1, wherein the first device allocates the fourth arc to the second device.

5. The method of claim 1, wherein the OID further comprises a higher arc which is in a higher position than the first arc.

6. The method of claim 1, wherein the hardware device comprises an OID registration and resolution system.

7. The method of claim 1, wherein the first device comprises a machine to machine (M2M) device and the second device comprises a legacy device.

8. The method of claim 7, further comprising providing, at the hardware device, an Intent of Things (IoT) service to the first device based on the OID.

9. A method of connecting to a device via a communication network, the method comprising:
    connecting, via the communication network, to a first device based on an object identifier (OID) of the first device, wherein the OID of the first device comprises a first arc identifying a manufacturer of the first device, a second arc identifying a product model of the first device and a third arc identifying a serial number of the first device; and connecting, via the communication network, to a second device which operates under the first device based on an OID of the second device, wherein the OID of the second device comprises the first arc, the second arc, the third arc, and a fourth arc.

10. The method of claim 9, wherein each of the OIDs of the first and second devices further comprises a higher arc which is in a higher position than the first arc.

11. The method of claim 9, wherein the hardware device comprises an OID registration and resolution system.

12. The method of claim 9, wherein the first device comprises a machine to machine (M2M) device and the second device comprises a legacy device.

13. A method of finding a device via a communication network, the method comprising:

finding a first device based on an object identifier (OID) of the first device, wherein the OID of the first device comprises a first arc identifying a manufacturer of the first device, a second arc identifying a product model of the first device and a third arc identifying a serial number of the first device; and finding a second device which operates under the first device based on an OID of the second device, wherein the OID of the second device comprises the first arc, the second arc, the third arc, and a fourth arc.

14. The method of claim 13, wherein the hardware device comprises an OID registration and resolution system.

15. The method of claim 13, wherein the first device comprises a machine to machine (M2M) device and the second device comprises a legacy device.

16. A system for allocating an object identifier (OID) to a device, the system comprising:

a memory device configured to store a plurality of device OIDs; and a hardware processor device being in data communication with the memory device and configured to allocate an OID to a first device, store the allocated OID of the first device in the memory, allocate an OID to a second device which operates under the first device and store the allocated OID of the second device in the memory, wherein the OID of the first device comprises a first arc identifying a manufacturer of the first device, a second arc identifying a product model of the first device and a third arc identifying a serial number of the first device, and wherein the OID of the second device comprises the first arc, the second arc, the third arc, and a fourth arc.

17. The system of claim 16, wherein the first device comprises a machine to machine (M2M) device and the second device comprises a legacy device.

18. A device for obtaining an object identifier (OID) from a hardware device, the device comprising:

a hardware processor device configured to request and receive an OID of a first device from a hardware device and request and receive an OID of a second device which operates under the first device from the hardware device, wherein the OID of the first device comprises a first arc identifying a manufacturer of the first device, a second arc identifying a product model of the first device and a third arc identifying a serial number of the first device, wherein the OID of the second device comprises the first arc, the second arc, the third arc, and a fourth arc; and a memory device being in data communication with the hardware processor device and configured to store the received OIDs of the first and second devices.

19. The device of claim 18, wherein each of the OIDs of the first and second devices further comprises a higher arc which is in a higher position than the first arc.

* * * * *